US008528022B1

(12) United States Patent
Schwartz et al.

(10) Patent No.: US 8,528,022 B1
(45) Date of Patent: *Sep. 3, 2013

(54) IDENTIFYING PROGRAMMING INFORMATION OF A TELECOMMUNICATIONS PROVIDER

(75) Inventors: Andrew Schwartz, Encino, CA (US); Mehran Sahami, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 209 days.

This patent is subject to a terminal disclaimer.

(21) Appl. No.: 13/100,209

(22) Filed: May 3, 2011

Related U.S. Application Data

(63) Continuation of application No. 11/842,766, filed on Aug. 21, 2007, now Pat. No. 8,001,571.

(51) Int. Cl.
*G06F 3/00* (2006.01)
*G06F 13/00* (2006.01)
*H04N 5/445* (2011.01)

(52) U.S. Cl.
USPC .......... 725/53; 725/59; 725/51; 725/49; 725/13; 725/35

(58) Field of Classification Search
None
See application file for complete search history.

(56) References Cited

U.S. PATENT DOCUMENTS

| 5,760,821 | A | 6/1998 | Ellis et al. |
|---|---|---|---|
| 5,988,078 | A | 11/1999 | Levine |
| 6,373,528 | B1 | 4/2002 | Bennington et al. |
| 6,388,714 | B1 | 5/2002 | Schein et al. |
| 6,396,546 | B1 | 5/2002 | Alten et al. |
| 6,498,895 | B2 | 12/2002 | Young et al. |
| 6,756,997 | B1 | 6/2004 | Ward et al. |
| 6,850,693 | B2 | 2/2005 | Young et al. |
| 7,600,249 | B1 | 10/2009 | Blevins |
| 2003/0004872 | A1 | 1/2003 | Gardi et al. |
| 2003/0046689 | A1 | 3/2003 | Gaos |
| 2003/0066085 | A1 | 4/2003 | Boyer et al. |
| 2003/0229898 | A1 | 12/2003 | Babu et al. |
| 2005/0055716 | A1 | 3/2005 | Louie et al. |
| 2008/0148317 | A1 | 6/2008 | Opaluch |

OTHER PUBLICATIONS

Koller, D., et al., "Toward Optimal Feature Selection", Proceedings of the Thirteenth International Conference (ICML'96), Bari, Italy, Jul. 3-6, 1996, Morgan Kaufmann Publishers, Inc., 1996, pp. 284-292.

Quinlan, J. Ross, "C4.5: Programs for Machine Learning", University of Sydney, Morgan Kauffman Publishers, Inc., San Mateo, CA, 1993, 315 pages.

*Primary Examiner* — Dominic D Saltarelli
*Assistant Examiner* — Jason J Chung
(74) *Attorney, Agent, or Firm* — Fish & Richardson P.C.

(57) ABSTRACT

Systems, and computer-implemented methods are described for selecting programming information from among multiple sets of programming information.

13 Claims, 11 Drawing Sheets

| ZIP CODE: | Telecommunications Providers |
|---|---|
| 55444 | Comcast |
| | Dish Network Minneapolis |
| | Dish Network USA |
| 55402 | Comcast |
| | Dish Network Minneapolis |
| | Dish Network USA |
| | Direct TV |
| | KSTC |
| | Independent |

320

| Telecommunications Provider | Channel | 7:00:00 PM CDT | 7:30:00 PM CDT | 8:00:00 PM CDT | 8:30:00 PM CDT |
|---|---|---|---|---|---|
| Dish Network Central | 9 | COPS | COPS | Amer. Most Wanted | Amer. Most Wanted |
| | 11 | Curb your enthusiasm | Curb your enthusiasm | Law & Order | Movie: Top Gun |
| | 300 | | | | |
| Dish Network USA | 9 | COPS | COPS | X-files | X-files |
| | 11 | | Law & Order | Dateline NBC | |
| | 300 | | | Movie: Shawshank Redemption | |
| Comcast | 9 | COPS | COPS | America's Most Wanted | America's Most Wanted |
| | 11 | | | (not a broadcast channel) | |
| | 300 | Router Workshop | Router Workshop | This Old House | This Old House |

340

| Dish Network Central | Headend ID | Channel | 7:00:00 PM CDT | 7:30:00 PM CDT | 8:00:00 PM CDT | 8:30:00 PM CDT |
|---|---|---|---|---|---|---|
| | DN-MN-01 | 9 | COPS | COPS | Amer. Most Wanted | Amer. Most Wanted |
| | | 11 | | Law & Order | Law & Order | |
| | | 214 | | Animal Planet | | |
| | DN-MN-02 | 9 | COPS | COPS | Law & Order | 24 |
| | | 11 | | | The Weather Channel | |
| | | 214 | | | | |
| | DN-MN-03 | 9 | COPS | COPS | Amer. Most Wanted | Amer. Most Wanted |
| | | 11 | | | Law & Order | |
| | | 214 | | | Music: Blues | |

IDENTIFYING PROGRAMMING INFORMATION OF A TELECOMMUNICATIONS PROVIDER

CROSS REFERENCE TO RELATED APPLICATION

This application is a continuation application of, and claims priority to, pending U.S. patent application Ser. No. 11/842,766, filed on Aug. 21, 2007, entitled "Identifying Programming Information of a Telecommunications Provider". The disclosure of the foregoing application is incorporated herein by reference in its entirety.

TECHNICAL FIELD

This document generally relates to television services, and more particularly to identifying programming information from a telecommunications provider.

BACKGROUND

Consumer demand for diversified television programming options has led to an increasing number of telecommunications (telecom) providers. These providers may have individual programming schedules where shows may be broadcast at different times and on different channels than the same television show broadcast by another provider. Multiple telecom providers may provide service for a given geographic area, and in some cases, the providers may offer a number of programming choices available to the consumer (e.g., different programming "packages"). While consumers may benefit from a wide range of programming options from a economical standpoint, the multitude of schedules that stem from this diversity sometimes makes finding a programming schedule a difficult and confusing. Of course, the most accurate programming schedule will correlate directly with the viewer's telecom provider, which may be a physical location where a telecommunications signal originates.

Online electronic programming guides (EPG's) are popular among television viewers, as they provide up-to-date programming information in an easy-to-use user interface that includes program times, channels, and oftentimes a brief summary of the content of the show. The guides can be used simply to visualize current programming, or in integrated software programs that allow a user to record shows that they select from the guide. EPG's may be offered by telecommunications providers (such as an online guide for Dish Network) as well as by independent sources such as TV Guide (www.tvguide.com).

Some online programming guides, especially those that are not directly related to a viewer's telecom service, use geographic identifiers to generate a list of programming schedules from telecom providers in a given geographic area. For example, an online guide may query a user for their zip-code, subsequently match a number of telecom providers corresponding to that geographic area, and present the user with a list of schedules from those providers for the user to select. However, with the growing number of telecom broadcasting stations and services, the user may be presented with so many schedules that they may not be able to pick the one that will correspond to the service they receive at their location. Also, different providers may offer services that overlap some geographic areas or portions of geographic areas, but not in others. In addition to the multitude of broadcasting companies, selecting a schedule becomes even more arduous when one takes into account the multiple programming packages that a company may provide. For example, a customer of a cable broadcasting company may be presented with multiple schedules corresponding to the packages that include movie channels such as HBO or Pay-Per-View. The issue of selecting the correct programming schedule becomes compounded if a user is not aware of the particular package to which they subscribe. Identifying a viewer's telecom programming schedule by querying them for information specific to their telecom provider may alleviate the difficulty of choosing the correct telecom programming schedule.

While many subscribers may know their telecom provider, such as by determining it from an invoice, the telecom programming schedule is oftentimes not a user-identifiable entity.

SUMMARY

This disclosure describes systems and computer-implemented methods for identifying a user's telecom programming schedule by querying the user for information, which may include questions pertaining to the user's geographic area, and the content of current programming displayed on their television, and comparing their response to a database of programming information collected from telecommunications providers. A series of exclusive, narrowing questions may ultimately identify the telecom programming schedule of the user, allowing the user to view an online programming guide that accurately reflects the program schedule for their particular telecom programming schedule.

In a first general aspect, a computer-implemented method is described. The method includes transmitting to a remote electronic device, one or more non-geographic requests for information about telecommunications service(s) for a user. One or more answers to the non-geographic requests for information are received from the remote electronic device, which answers do not identify the user's telecommunications carrier. Based on the one or more answers, carrier-specific programming information from among multiple sets of programming information are selected for delivery of television programming information to the user.

In one general aspect, the requests may include queries about the user's currently broadcasted programming. The computer-implemented method may further include identifying a television head end having characteristics that match the one or more answers.

In another general aspect, the computer-implemented method may further include transmitting an electronic program guide corresponding to a head end to the remote electronic device.

In yet another general aspect, the computer-implemented method further includes transmitting to the remote electronic device a geographic request for information and receiving a geographic answer. In some embodiments, the geographical response can include a zip-code.

In yet another general aspect, selecting carrier-specific programming information includes matching the received one or more answers to a database of programming information. In some embodiments, selecting carrier-specific programming information further includes eliminating information that is inconsistent with the received one or more answers until a single instance of carrier-specific programming information is identified.

In another general aspect, a computer-implemented method is described. The method includes receiving from a user a geographic area identifier, identifying one or more telecommunications providers within a geographic area associated with the geographic area identifier, requesting non-geographic information and receiving one or more non-geographic responses, and identifying a telecommunication provider from the one or more telecommunication providers that is associated with the one or more non-geographic responses. In some embodiments of the method, each telecommunication provider comprises a head end. In some embodiments, the method further includes providing the user with an electronic program guide for the head end.

In yet another general aspect, a system is described. The system includes an interface to receive a geographical identifier from a user and a selection module to identify one or more telecommunications providers within a geographic area associated with the geographic area identifier. Means for transmitting carrier-specific programming information from among multiple sets of programming information to the user are included, wherein the programming information corresponds to programming available to the geographic area.

In yet another general aspect, a computer-implemented method is described. The method includes receiving from a user a geographic area identifier and identifying one or more telecommunications providers within a geographic area associated with the geographic area identifier. The method further includes requesting non-geographic information and receiving one or more responses that include non-geographic information associated with the request. The method further includes identifying a telecommunication provider from the one or more telecommunication providers that is associated with the one or more responses.

The details of one or more embodiments are set forth in the accompanying drawings and the description below. Other features, objects, and advantages will be apparent from the description and drawings, and from the claims.

DESCRIPTION OF DRAWINGS

FIG. 3 is a representative data structure comprising programming information according to one implementation.

Like reference symbols in the various drawings indicate like elements.

DETAILED DESCRIPTION

Figure 1A:
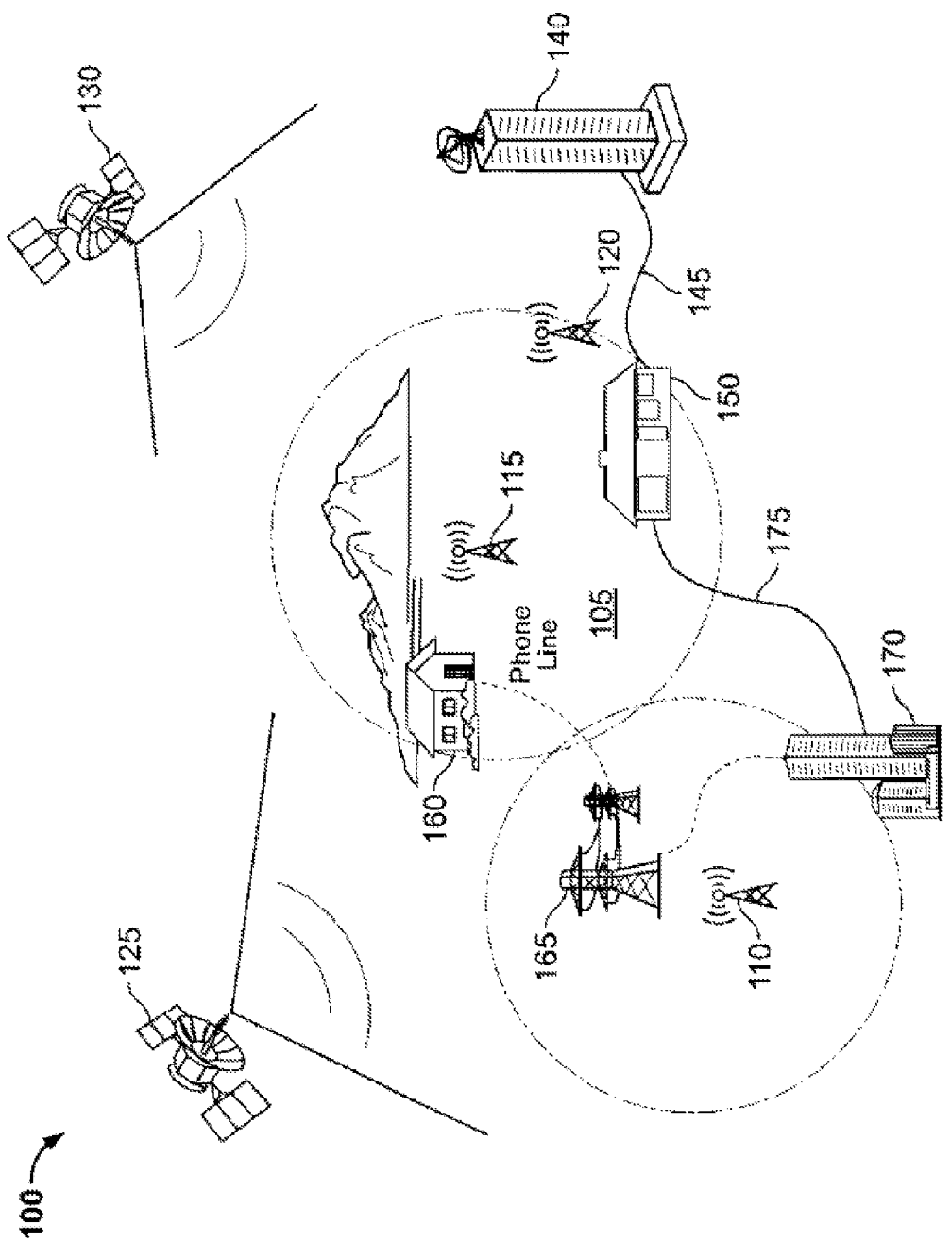
FIG. 1A shows schematically an area of telecommunications broadcast coverage.

FIG. 1A is an environment that includes multiple telecommunications broadcasts and various mechanisms to receive the broadcasts over a geographic area 105. Broadcasts may emanate from commonly-known sources, such as transmitting towers 110, 115, 120, cable sources 140, and satellites 125, 130, for example. Within the geographic area 105 there may be one or more dwellings 150, 160 where receivers may be used to obtain programming from these sources. The ability to receive broadcast signals over the geographic area 105 generally depends on the modality of the source: satellites 125, 130 may provide the widest geographic coverage, whereas broadcast antennae 110, 115, 120 may cover less area (indicated by the dashed line surrounding each tower). Telecom cable 145 may physically connect a cable station 140 to a dwelling 150; thus, "coverage" in this context is limited by the extent to which the cable company wishes to extend its service beyond a given area.

Dwelling 160 may be limited to receiving telecom signals from satellites 125, 130 (which may be owned by the same or different network providers), and antenna 115, due to the geographical locale of the dwelling and the inherent difficulties in providing cable connections to remote areas. Dwelling 150, on the other hand, may have increased programming options, including telecom service from satellites 125, 130, cable companies 140, and antennae 110, 120. The choice of which broadcast to receive is a consumer decision and may be based on factors such as programming options, signal strength, and cost. Viewers may use EPG's via an internet connection through an internet service provider (ISP) 170 to access online programming guide services (e.g., web sites or data broadcast over unused spectrum) that may contain programming schedules, information, and other related data. Viewers may connect to their ISP using common mechanisms, including satellite services (not indicated in FIG. 1A), DSL (not indicated in FIG. 1A), cable internet connections 175, and through dial-up connections 165.

To enjoy programming from the telecom sources in FIG. 1A, a user may wish to use an EPG to visualize a schedule of programs; however, the user may not know which mode of broadcast (satellite 125, 130, cable 145, or antennae 115, 120), nor which telecom service package (if applicable) their receiver is receiving. In a general embodiment, the telecom programming schedule ID system may determine the most accurate programming schedule for a user by resolving their telecom broadcast modality and service, and present the user with programming information that corresponds to their particular telecom service. The determination may be made by querying the user for information that is related to their telecom provider, which may include current programming content, or other queries that are not directed to a particular locale, such as the design of their telecom service bill (e.g., the color of the bill, or distinguishing characteristics of the bill, such as a telecom provider logo) or the size and shape of their satellite (if applicable), or signal receiver, for example.

In some cases, the consumer cost of programming "packages" are known. For example, a basic subscription to a satellite service such as Dish Network may have a consumer cost of $29.99 per month. Additional programming content often adds cost to the total, such that a person subscribing to basic service plus two "premium" channels (such as HBO and Cinemax) may incur a cost of $56.91. This number may be such that it distinguishes Dish Network from other service providers and may an appropriate query for the user to determine the user's telecom provider.

Figure 1B:
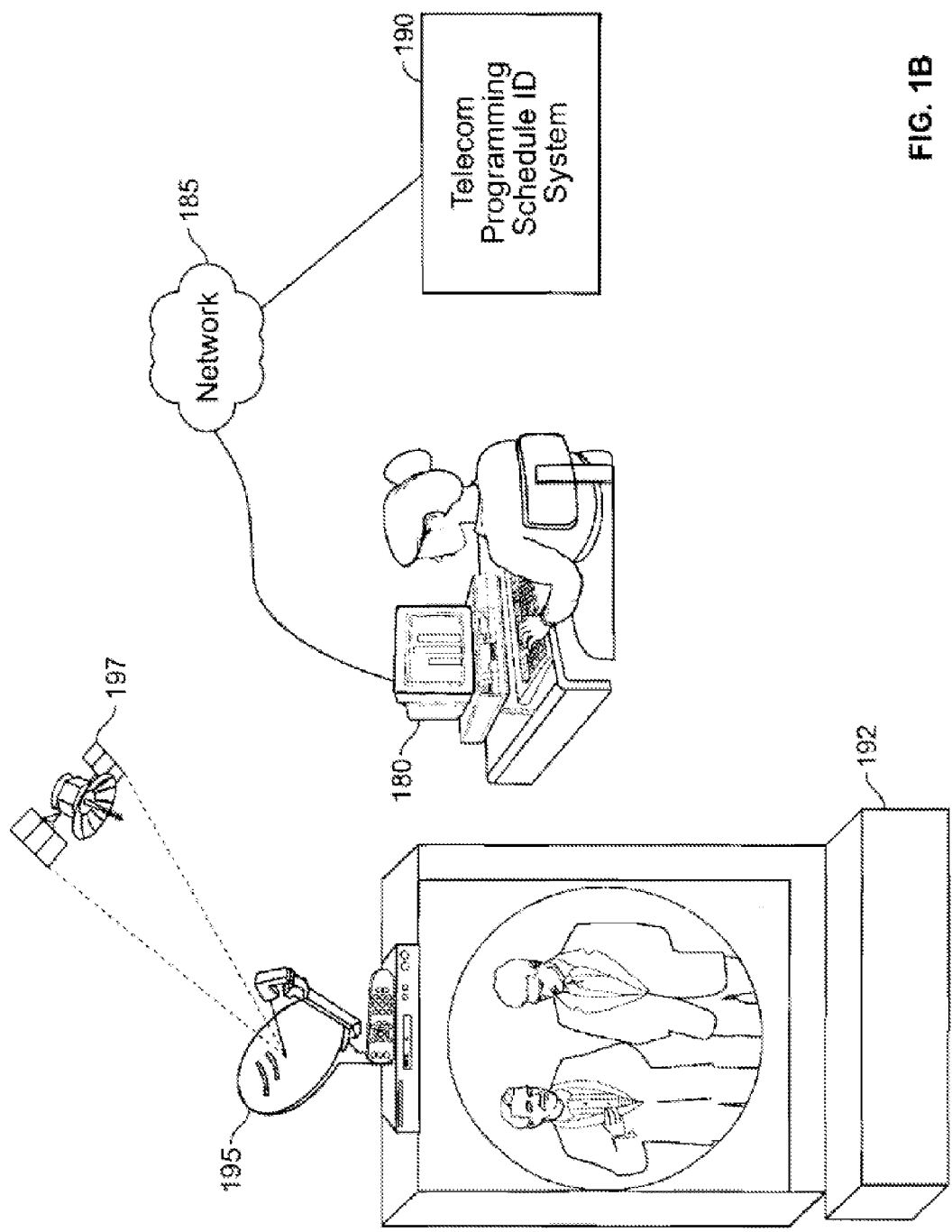
FIG. 1B is a system diagram containing elements for determining a user's telecom programming schedule, according to one implementation.

FIG. 1B is a system diagram containing elements for determining a user's telecom programming schedule, according to one implementation. The system 179 may be used to identify a user's telecom programming schedule using a receiver 195 that may be receiving a broadcast signal, in this case a satellite 197 signal, and a computer 180 connected to a network 185 which may have access to a telecom programming schedule ID system 190. A user may access the telecom programming schedule ID system 190 via a computer 180 and network connections 185. Although shown for clarity, as being accessed through a desktop computer 180 the telecom programming schedule ID system 190 may also be accessed by other mechanisms such as set top boxes or wireless mobile devices such as smartphones.

The telecom programming schedule ID system 190 may present the user with a series of questions that narrow the number of telecom programming schedules that exist for the user's area. From the answers received from the user, the correct telecom programming schedule may be identified. For example, an initial query from the telecom programming schedule ID system 190 can ask the user for a geographic location identifier, such as their zip-code. From this information, the telecom programming schedule ID system 190 may access information about telecom providers that exist or provide service in the given zip-code, as well as detailed programming information (i.e., the past, current, and future schedule of television programs) from the telecom providers. Such location-based queries may adequately resolve the number of possible carriers to a single carrier or a small number of carriers. However, they may be insufficient where there are many carriers, such as where carriers overlap in dense urban and suburban centers, and where single carriers have multiple programming options (e.g., premium packages) or homes similar to other nearby carriers (such as different offices or franchisees for a national carrier). In such situations, such as when the user indicates that the locale-base queries have not narrowed the field enough to determine the proper schedule, the system 190 can make further queries. For example, the telecom programming schedule ID system 190 may prompt the user for information on programming that is being received by their television 192 on a certain channel. An example prompt may be "What show is currently playing on channel 11?" The user may then select the corresponding show, for example, from a drop-down list of programs that are currently being broadcast on channel 11 from each of the possible telecom providers.

Continuing this example, if a particular show is being aired on channel 11 that is exclusive of the other telecom providers, the telecom programming schedule ID system 190 may deduce the user's telecom programming schedule by virtue of this exclusion. However, if multiple telecom providers are airing the same show on the same channel, the telecom programming schedule ID system 190 may need to provide additional queries to the user (such as "What show is currently playing on channel 2?") so as to narrow the choice of telecom programming schedules to a singular entity. At some point, the list of possible schedules may shrink sufficiently that the user can simply pick the appropriate schedule. Once a user's telecom programming schedule has been determined, they may view the correct programming schedule information for their particular telecom service setup using an online guide.

The telecom programming schedule ID system 100 can select programs to submit to a user by first identifying channels that currently display different programs for different telecom head ends for the user's area. For example, broadcast stations may not be selected because they are likely to be provided on the same channel for all head ends in a geographic area. Channels may also be selected that do not run commercials, or may be selected for a time when a program is unlikely to be in a commercial break, so that a user may more readily determine the current program being carried on the channel.

In one embodiment, to make the selection of programming easier for the viewer, the system 100 can show current pictures or streams of what is on each possible channel, allowing the user to select that channel by selecting the appropriate image(s), such as by a mouse click, for example. In this embodiment, the programming schedule may be presented in the form of a two-axis grid, with channels on one axis and time on the other. Frames that contain the pictures or streaming images may make up the grid contents, with each frame representing the programming content of a different channel for a given time period, i.e., they may show a "snapshot" or current content of a given television program. A user may select programming simply by navigating the grid and selecting a frame conducive to their viewing desires.

The system 100 can monitor the user's viewing habits and present to the user "customized" programming schedules, thus minimizing the number of queries the user may have to make to find desirable programming. Monitoring the user's viewing habits may be accomplished, for example, by extracting data from the schedule of frequently viewed programs, searching the current programming schedule for related content, and presenting that to the user in a customized grid view. For example, the system 100 may generate, for a viewer who consistently watches "Days of our Lives," a "soap opera," programming content of other soap operas that occur throughout the day in a customized view.

The system 100 may be used both as a programming guide that a user may access to view the programming schedule particular to their content provider, and also to record programming, by selecting currently-aired broadcasts, or those that are scheduled in the future. Schedules can be provided on the device that is displaying the programming, such as through interactive, integrated schedules commonly used with cable and satellite systems; alternatively, the schedules can be provided on ancillary devices, such as personal computers interfaced with a television set or a mechanism for viewing broadcasted programming content.

Figure 2:
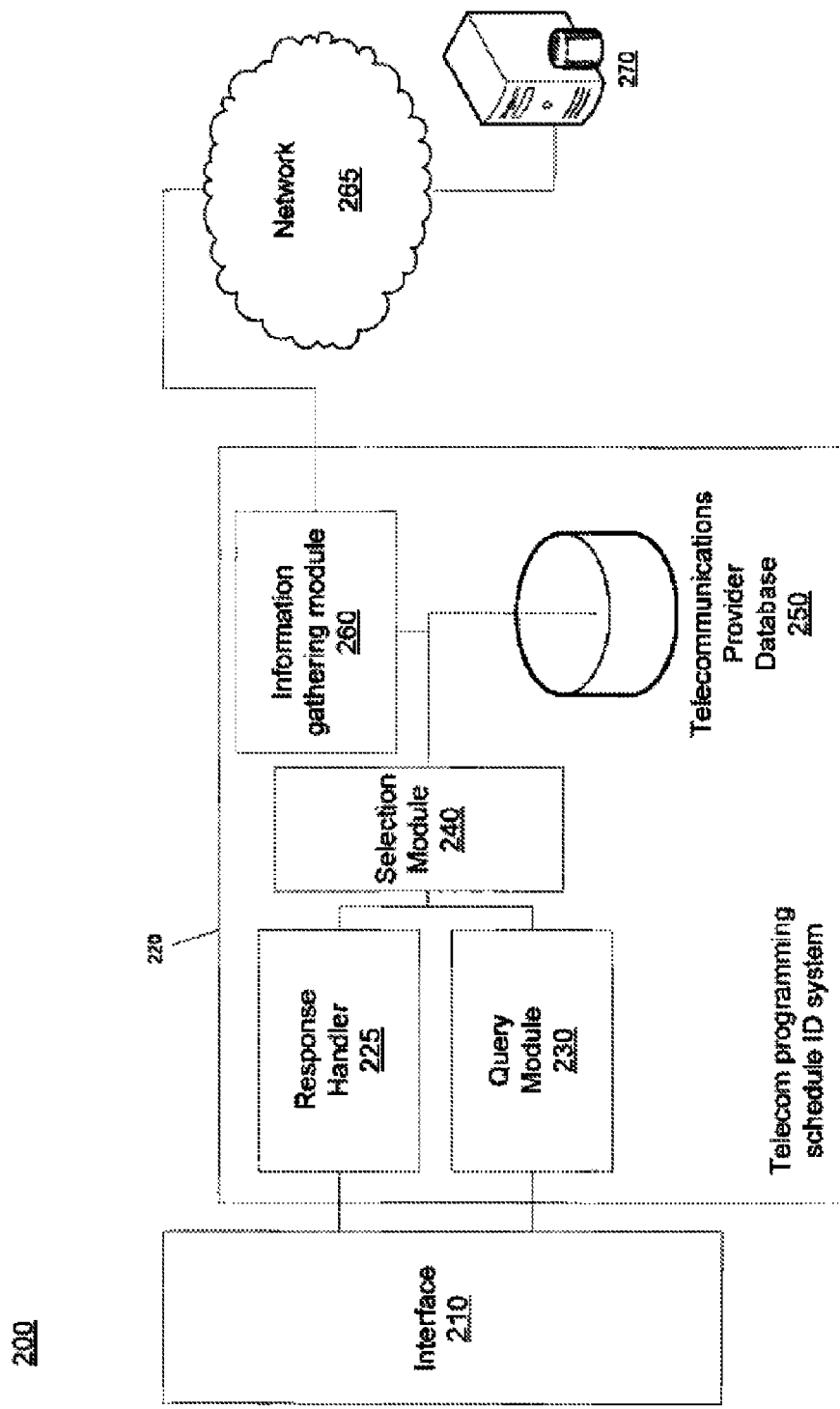
FIG. 2 shows components related to determining a user's telecom programming schedule, according to one implementation.

FIG. 2 is a system 200 showing components related to the telecom programming schedule ID system according to one implementation. The system 200 can include an interface 210. The interface 210 can send and receive information to and from a programming schedule ID service 220 and a telecom provider database 250, described below. Interface 210 may be a device which allows a user to view, search, and interact with the programming schedules described above, and may include, for example, a television, a personal computer, or other electronic devices that allow for user interaction with the system 100. The interface 210 may include functionality that allow a user to navigate programming schedules, including receiving instructions or commands via point-and-click devices (mice), remote controls, touch screens, and the like.

An information gathering module 260 may collect programming information from telecom data provider 270 over a network 265 such as the internet and may store the information in a telecom provider database 250. The information gathering module 260 may be an automated system that frequently polls sources of programming information, such as the telecom data provider 270, and other third-party information sources, including programming and movie websites, and online TV-guides. Information from the database sources collected may be compiled into a logical structure for efficient data storage and recovery. For example, schedule information collected from an online TV-guide may simply contain a database of channel, time, and program titles. The information in the database may be enhanced, however, by matching programming titles and adding to it, in-depth data collected from a source that provides additional details, such as a storyline, the actors, or series information, if applicable.

Telecom provider database 250, can be a repository of information including past, current, and future telecom broadcast information. The database 250 may contain extensive information related to programming content beyond a simple title. For example, the database 250 may be a website such as the Internet Movie Database, which lists extensive information on the actors, genre, rating, and awards, associated with a particular program. The information in the database 250 can be used by the system 100 in determining a user's preference for programming content, by matching information from the database from one program with others in the database 250. Furthermore, the database 250 may contain files containing images or "clips" of programming content that can be presented to the user in the types of schedule displays described above.

A "selection" module 240 can use information from the telecom provider database 250 and generate logical queries to pass to the query module 230, described below. The selection module 240 accomplishes the task of generating user queries that start at a high level in the process of determining a user's head end, and further refining those queries until a substantially definitive match is found. The queries may be passed to the query module 230, which sends the query to the user; the response is received by the response handler 225, and passed back to the selection module 240, thus completing a "loop" that may iterate multiple times before a user's head end is identified. The selection module 240 may construct queries to determine first, what geographical area (e.g., a region of the country) the user is in. The answer received by the user may allow the module 240 to further narrow the query, such as by identifying the broadcast providers for that area. The module 240 may then ask the user about more specific broadcast information that relates to the broadcast providers, for example, by asking whether they receive a certain channel. The process is repeated until a substantially definitive match to the user's head end is identified.

A query module 230 and a response handler 225 work in concert to present interactive queries to the user during the process of determining the user's head end. The query module 230 can perform the task of presenting queries to the user in the form of questions or requests for input. For example, the query module 230 may generate the code necessary to present a question in HTML language, if the user is interacting with the programming schedule ID service 220 via a personal computer. Likewise, other software protocols or languages may be employed to communicate with the user if, for example, the user is interacting with the programming schedule ID service 220 via an interface on their television, remote control, touch screen, or the like.

A response handler 225 receives information sent by the user's device and passes that information to the selection module 240. The response handler 225 can translate the information received by the user into the language or code necessary to be understood by the selection module 240 so that further narrowing of the queries can be accomplished.

In a preferred implementation, determination of a user's headend is based on queries formulated using a decision tree, using programming schedule data that correlates two discrete random variables: Y (possible headends) and Xi (channel features). The decision tree can be constructed by treating the set of available headends as a dependent ("class") variable being predicted and, for each headend, a set of features Xi representing what is currently playing on channel i on that headend. A measure of correlation can then be computed. Probability and information theory presents a formalism for finding the mutual information of these two variables, which allows the user's headend to be narrowed from a group of available headends.

The mutual information between possible headends (Y) and channel features (Xi) can be expressed as:

$$I(X;Y) = \sum_{y \in Y} \sum_{x \in X} p(x, y) \log\left(\frac{p(x, y)}{p(x)p(y)}\right),$$

where p(x,y) is the joint probability distribution function of X and Y, and p(x) and p(y) are the marginal probability distribution functions of X and Y respectively. Each of the Xi channel features can be computed with respect to the possible headends Y, i.e., I(Y;X1), I(Y;X2) . . . etc. The largest-value computed channel feature Xi is then selected.

The use of the decision tree, when formulating queries to the user, can incorporate a user's answer to a previous question to aid in narrowing the selection of the user's headend. In other words, the choice for each new question can be probabilistically "conditioned" based on the previous answers, and the computation of mutual information is a conditional mutual information based given in the previous answers.

For example, if a user has previously indicated that "Rescue Me" is playing on channel 45, then the determination of the next query to pose to the user (for re-computing the mutual information values to determine the next channel to ask the user about) will consider only programming data that has Rescue Me on channel 45.

An exemplary decision tree illustrating the decision-making process described above is shown in FIG. 4A. In this example, the query module 230 has posed a query 473 to the user regarding his physical whereabouts, and the response handler 225 has received the user's zip code (Minneapolis, Minn.) as a response 473a. The response 473a has narrowed the list of possible headends for the user to four, Headends A-D (475, 476, 477, and 478 respectively in FIG. 4A). This list may be built from pre-compiled information on the regional broadcast areas of telecom providers, for example. The channel listing of each headend as well as its broadcast area is indicated in FIG. 4A.

The selection module 240 may exclude Headend B 476 from the list of possible user headends because the service area is relatively distant from the user's location. Using this information then, the selection module 240 may examine the channels provided by each headend and construct a second query 479 to further narrow the selection. Because each headend provides multiple channels, the selection module 240 may utilize certain criteria on which to formulate subsequent queries that resolve the user's headend quickly through the query/response process. For example, the selection module 240 may choose the channels or programs that are most likely to be watched during a certain time (e.g., by accessing an online database of Nielsen ratings) instead of picking channels at random for querying the user. This approach can be advantageous for, among other reasons, permitting fast recognition of programming content so the user can definitively answer queries.

The selection module 240 has chosen channels 2, 11, and 100 to use in the process of discriminating the user's headend (channel features Xi, as referenced above). Query 2 (479) asks the user what programming content they are receiving on CH. 2, and the user response 479a indicates that the show COPS is airing on that particular channel. Headend A 475 and Headend D 478 are both broadcasting COPS, and thus Headend C 477 has been eliminated, but one further round of queries is necessary to resolve the user's headend.

Query 3 (480) then, is constructed using only the programming data of headends that are airing COPS on CH. 2 (Headend A and D), and asks the user about the programming they are receiving on channel 100. The answer 480*a* indicates that "Moros y Cristanos" is currently airing on the user's device, which narrows the selection 481 of the user's headend to one: Headend D 478.

In certain embodiments, if the user was not familiar with either show on their channel 100, the user can indicate this and the selection module 240 can construct a different query. In some cases, the query might include asking the user about programming on a different channel, or, in the case of the programming shown in FIG. 4A, the selection module 240 may ask what language the programming on CH. 100 is airing in; if the user responds that the language is Spanish (as Moros y Cristanos is a popular show aired in Spanish), the selection module 240 may use this as a positive indication that the user's headend is Headend D 478.

The list of headends and the number of channels per headend in FIG. 4A is drastically over-simplified, and in operation, the number of available headends and channels may be quite large.

The telecom programming schedule ID system 220 can provide the capability of storing user information, and presenting to the user, targeted programming or advertising information based on the type of programming the user frequently views. For example, the system 220 may utilize a user identifier, such as a user name that the user must provide to "log in" before using the system 200. Alternatively, targeted programming or advertising may be implemented for certain demographic or geographic areas, once the user's head end has been identified. As an example, if the system 220 determines the user's head end is located in Anchorage, Ak., the system 220 may present the user with advertising that centers on nature activities, such as wildlife tours or camping.

In a preferred embodiment, a user's head end ID is determined as follows. The user establishes a connection with the telecom programming schedule ID system 220 via an interface 210. The system 220 has an established repository of programming information already stored in the telecommunications provider database 250 via the information gathering module 260, which has collected programming information from outside sources such as the telecom provider programming database 270 via network 265. The selection module 240 constructs user queries that are passed to the query module 230; the user responds to the query via interface 210, and the response is received by the response handler 225. Response handler 225 passes the response to the selection module 240, which, based on the response, formulates a user query that narrows the user's head end ID from the available choices. By iterating the query process, the identification of the user's head end is progressively narrowed until there is preferably only one logical choice. Upon identifying the user's head end, the system 220 presents the user the programming content, schedules, and targeted information or advertising based on the characteristics of the user, such as their programming preferences, geographical area, or other factors.

FIG. 3 shows representative data structures 300 comprising programming information according to one implementation. These exemplary data structures 300 of programming information from telecom providers a data base such as presented to illustrate a narrowing process for multiple telecom programming schedules. Data structure 320 includes an exemplary list of telecom providers grouped according to the geographical area (identified by zip-code) that they service. Using the data structure 320, an initial user query may be generated for identifying the user's geographical area. For example, if a user lives in the 55444 zip-code, the telecom programming schedule ID system 190 may return four possible telecom providers: Comcast, Dish Network Central, Dish Network USA, and KSTC. If there were only one provider (which is not the case in FIG. 3), and that provider broadcast their programming from only one source, the information returned by the telecom programming schedule ID service 190 may be sufficient to identify the correct telecom programming schedule for the user. Generally there will not be one provider because most every locale has at least satellite broadcasting and some minimal level of over-the-air broadcasting.

Especially in large cities, there will likely be more than one, and often many telecom provider for a given geographical area particularly when each different schedule, or its corresponding head-end, is considered to be a different telecom provider. When a user specifies their area as described above, the telecom programming schedule ID system 190 may execute a selection-narrowing process by identifying distinguishing attributes of the providers or sources. For example, KSTC, a ground-based antennae broadcast service in the 55444 zip-code geographical area, may offer, in combination with the other over-the-air broadcasters in the area, fewer channels than the cable or satellite providers, which may be a characteristic that distinguishes KSTC from the other providers. The system 190 may prompt the user to change their television to a channel not normally broadcast by ground-based antennae systems, such as channel 300. Using the exclusion methods described above, the system 190 may query whether or not the user can view programming on channel 300; if so, the system 190 may conclude that the user has a subscription to a cable or satellite system and may exclude KSTC (and the other local over-the-air broadcasters, if it can be inferred that such local channels can be obtained from the remaining possible carriers), from the list of possible providers. To help ensure a correct conclusion, the system 190 may prompt the user to try viewing other channels normally outside the range of ground-based antennae services.

If multiple telecom providers remain as possible choices for the user's service after a given query, further exclusion of providers may be necessary, and this exclusion may be based on programming schedules or other non-locale based information, rather than geographic discrimination. To this end, data structure 340 includes exemplary information that may contain lists of the telecom providers, the channels provided by the provider, and programming information for those channels. The data structure 340 may be considered a "slice" out of a larger data structure for illustrative purposes in FIG. 3. In the exemplary data structure 340, the programming information may include show times, show title, and show information corresponding to a unique channel, which in turn corresponds to a unique provider. Show times may be expressed in a variety of ways according to the telecom broadcaster's preference. For example, show times may be listed in terms of a time zone and a time-of-year modifier, such as, for example, "Central Daylight Time" (CDT). Alternatively, a time may be specified relative to "Greenwich Mean Time" (GMT), for example, "GMT +5," referring to a location that is five hours behind the historical time-zone reference in Greenwich, England. The information in data structure 390 is shown in a user-friendly form for clarity of explanation the typically less readable data and organization may be used, such as by using program ID numbers.

Narrowing a number of telecom providers may be necessary before identifying the user's telecom programming schedule. The telecom programming schedule ID system 190 may accomplish this by gathering database information 340 from the telecom provider database 250 and generating queries that exclude telecom providers based on the programming the user is able to view. For example, at 7:45 PM CDT (user's local time), according to the programming schedule in the database 340, channel 11 is not a broadcasted channel from the Comcast network, whereas the opposite is true for the Dish networks. Exploiting this difference (considering the time is 7:45 CDT in the user's time zone), the system 190 may prompt the user to tune their television to channel 11, and ask whether or not a broadcast signal is being received. If there is a signal (i.e., in the form of broadcast television show), the system 190 may conclude that the user subscribes to Dish Network, but again, more queries may be performed to validate this conclusion.

Another possibility is to query what is showing on channel 300 and include a list of programming currently running on channel 300 from each of the provider sources for the user to select: 'Curb Your Enthusiasm,' 'Shawshank Redemption,' or 'Router Workshop.' There also may be a field to indicate 'none of the above' or 'I don't know' in case the user can not recognize the show. If the user responds by selecting 'Curb Your Enthusiasm,' the system may conclude that the user subscribes to Dish Network Central, and may begin a telecom programming schedule identifying process as described below. However, the system 190 may pose additional queries to validate this conclusion.

Continuing the example, the system 190 may now need to distinguish between multiple broadcasts from the same company (Dish Network Central) to determine the correct telecom programming schedule of the user. Data structure 360 is similar in style to data structure 340, and includes programming schedule information for specific telecom programming schedules from the Dish Network Central provider. In this case, the three broadcasts from Dish Network Central sources are shown. To identify the user's telecom programming schedule, the system may prompt the user to change to channel 214, as different broadcasts may originate from the three exemplary telecom programming schedules at 7:45 PM CDT. The system 190 may pose the query "What is currently on channel 214?" and include a menu of user-selectable choices including 'Animal Planet,' 'The Weather Channel,' and 'a music channel.' Recognizing, for example, that channel 214 is receiving a music channel, the user may respond with the 'music channel' option, wherein the system 190 may then positively identify that the user's telecom programming schedule correlates to DN-MN-03, which may be, for example, a "headend" identifier. Request may also be made to determine whether a user subscribes to particular pay channels from an identified head end.

Recapping the above example, the telecom programming schedule determination service may identify a user's telecom programming schedule by querying the user with questions that progressively narrow the selection of possible telecom programming schedules to one. The queries may be selected to narrow the choice as quickly as is practical. In the preceding example, the system 190 used information included in a telecom provider database to generate a list of telecom providers for a given area, then excluded one or more providers based on programming reception, and finally excluded all telecom programming schedule choices to one, by querying the user for content-related programming information and comparing the responses with the database.

In some cases, there may be circumstances in which queries relating to current programming may not resolve the user's programming schedule. An example may be during periods of interrupted broadcast reception (e.g., during a severe weather event), or in a case in which the user is not familiar with any of the programs posed by the query module 230 or is away from home. The system 190 may then query the user for information regarding certain attributes of their telecom provider. For example, the query module 230 may ask a user "what color is your telecom provider statement (i.e., monthly bill)?" or, the module 230 may present the user with several images of related satellite receivers and ask the user to match their receiver with one of the images. The module 230 may query how much their programming subscription package costs, or whether they have a satellite dish in the vicinity of their dwelling. In any case, the query module 230 may utilize any of the data contained in the telecommunications provider database 250 to construct queries which may be used to exclude one provider or telecom service over another.

Figure 4:
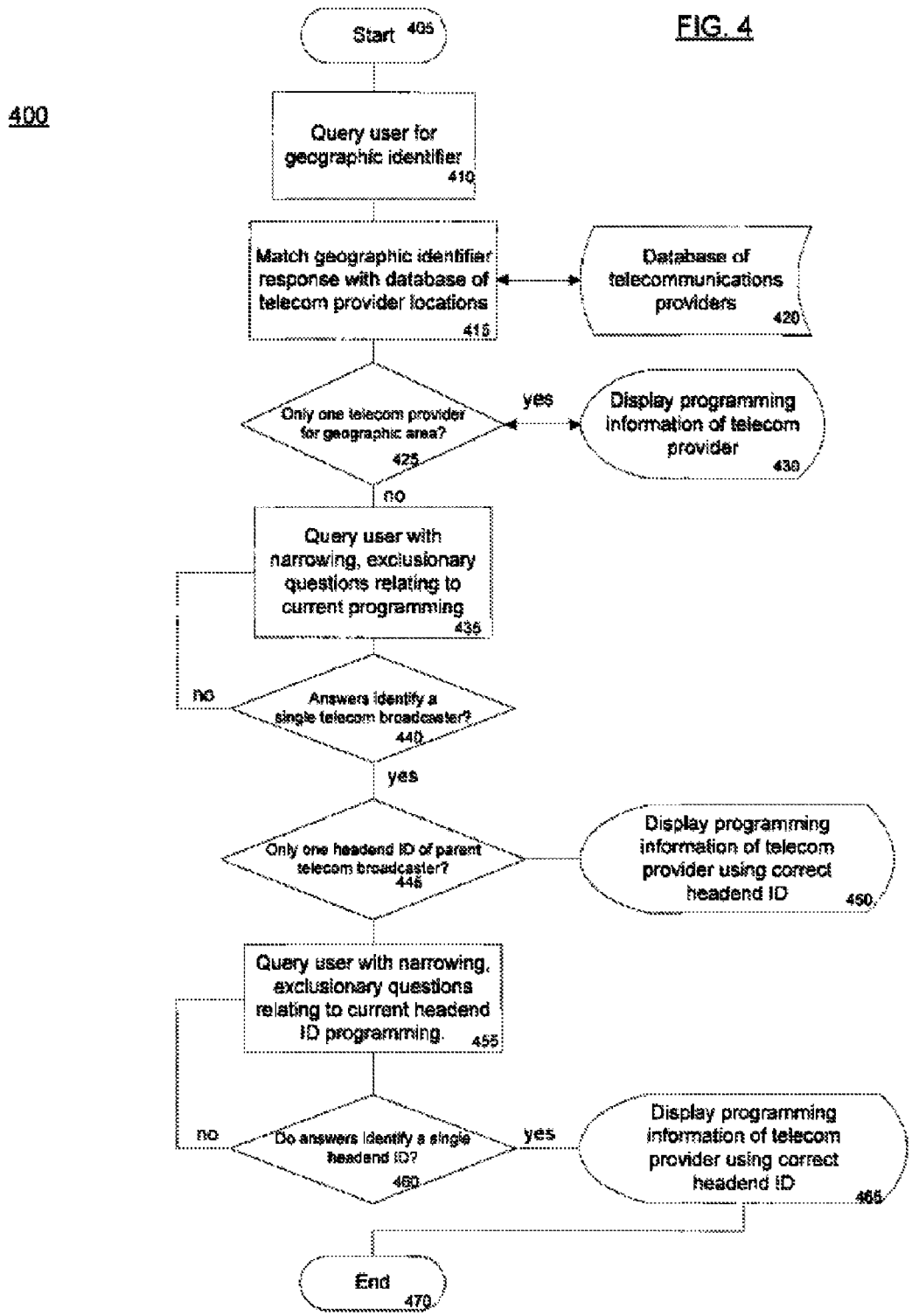
FIG. 4 is a flowchart representing steps to determine a user's telecom programming schedule, according to one implementation.
Figure 4A:
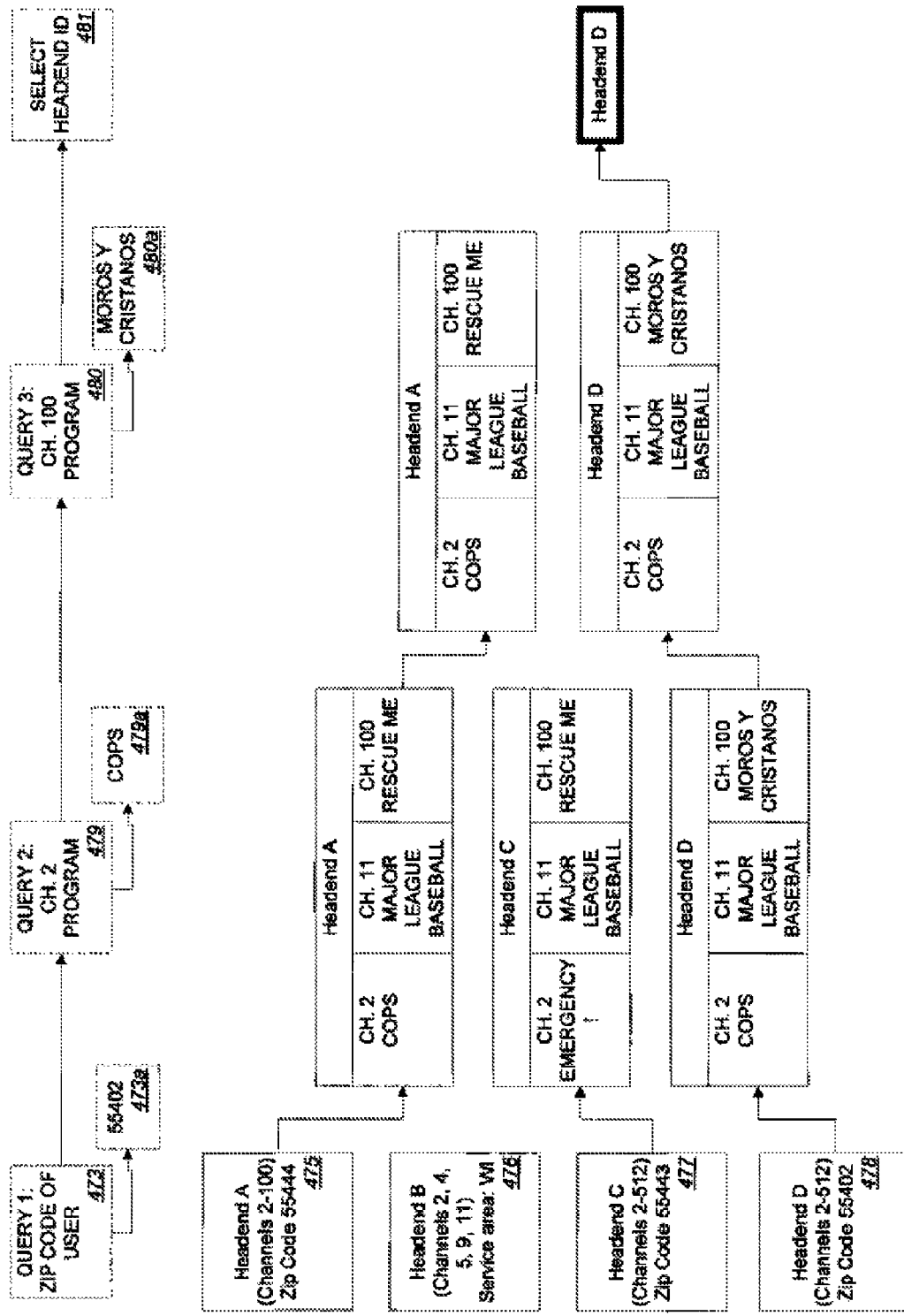
FIG. 4A shows an exemplary decision tree illustrating a decision-making process.

FIG. 4 is a flowchart representing steps to determine a user's telecom programming schedule, according to one implementation. The process may begin at step 405 and proceed to step 410 by querying a user for a geographic identifier, such as a zip code. The response may be received from the user and matched against a database 420 containing telecom providers and the geographic areas they cover, as in step 415. If only one telecom provider, or head end, is found for the geographic area of the user (step 425), the programming information may be displayed using the information provided by the telecom provider (step 430).

If more than one telecom provider is found for the geographic area of the user, or if more than one source, or head end, is used for a given provider, the user may be queried with one or more narrowing, exclusive questions to determine their telecom programming schedule. The response to the query from step 435 may or may not identify a single telecom broadcaster (step 440). If a single telecom provider was not identified in step 440, the process may return back to step 435 to further narrow the choices of selecting a provider. Step 445 may identify if a single telecom programming schedule is identified for a particular telecom provider; if so, the programming information for that telecom programming schedule may be displayed to the user as in step 450. If there are multiple telecom programming schedules for a particular telecom provider, then the user may be queried with additional narrowing, exclusive questions that serve ultimately to select one telecom programming schedule, steps 455 and 460. Identification of a single telecom programming schedule, which may be associated with a particular head end, from step 460 may result in programming information being presented to the user corresponding to that telecom programming schedule, step 465.

Figure 5:
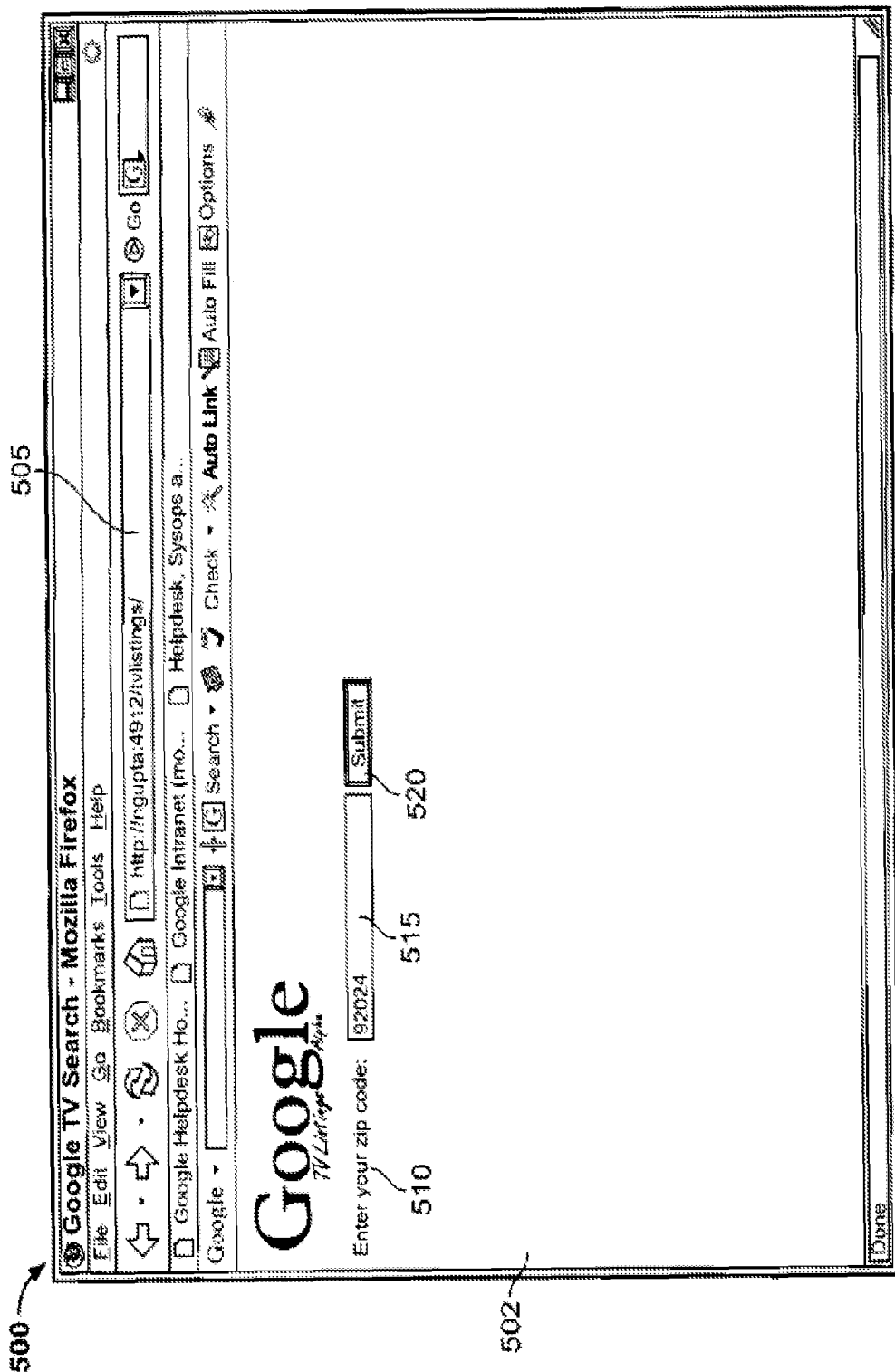
FIG. 5 is a screen shot showing an exemplary entry for a tv listing service.

FIGS. 5-8 present screen shots showing the progress of an illustrative example of the selection and identification of telecom programming information. FIG. 5 is a screen shot showing an exemplary entry for a TV listing service. The screen shot 500 includes a web browser window 502 that displays content 502 within the window that may be provided by the system 190 or another appropriate system. Web browser windows 501 typically contain an address field 505 which users fill in to navigate to various web pages on an intra- or internet. In this example, the user has navigated to a telecom programming schedule determination page which has displayed the window content 502. A first query 510 has been generated here, such as by the query module 230, which asks the user to input their zip code. An input field 515 allows the user to enter the information, and a user-selectable link 520 allows the user to submit a selection to a structure such as response handler 225.

Figure 6:
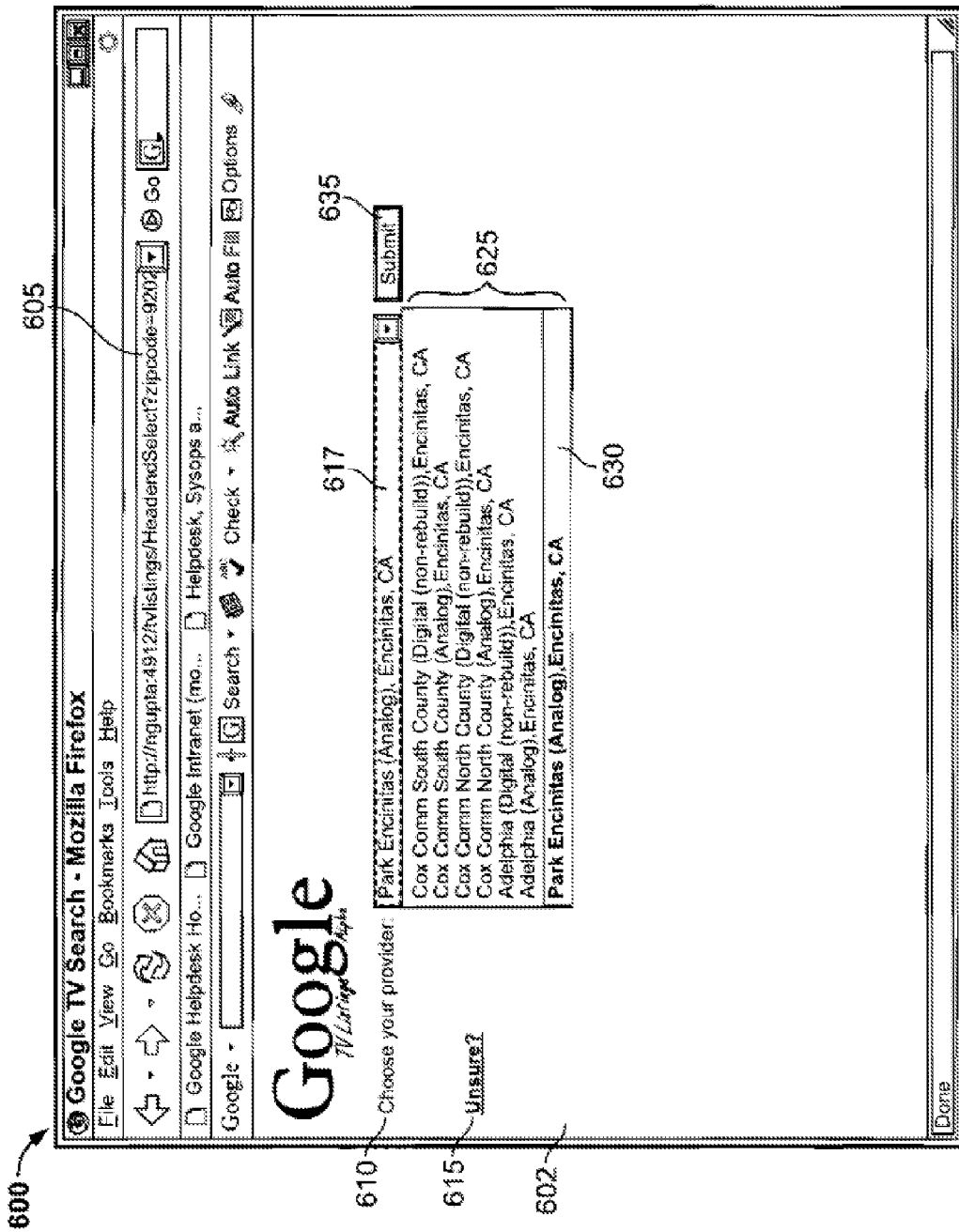
FIG. 6 is a screen shot presenting options as a result of user response from FIG. 5.

FIG. 6 is a screen shot presenting options as a result of user response from FIG. 5. The figure shows a web browser window 601 displaying content 602 in a display area, the substance of which may depend on the user input to the response handler 225 from FIG. 5. The address field contents 605 may be the same or different from that in FIG. 5, which may reflect redirection to different pages of the telecom programming schedule ID system. The query module 230 may generate a user prompt 610, such as "can you see a broadcast on channel X," where X is a channel determined by the telecom programming schedule ID system that may provide some level of discrimination (or complete discrimination) against other telecom providers, based on the input received from the previous query 510.

In this example (FIG. 6), a system such as the telecom programming schedule ID system 190 has identified seven telecom providers that offer service in the 92024 zip-code area, input from FIG. 5, and has presented the user with a drop-down list 625 of these providers for the user to choose. If the user knows their provider (such as from an invoice), the user may select one of the choices (in this example, "Park Encinitas (Analog), Encinitas, Calif." choice 630, which may enter the choice 630 into the input field 617. The user may then submit the input to the response handler 225 via a user-selectable control 635. In some instances, the user may not know their service provider. In such a case, the user may select an alternate control, for example, the "Unsure?" link 615, which may indicate to the response handler 225 that the telecom programming schedule identification process may have to proceed without knowledge of the telecom provider.

Figure 7:
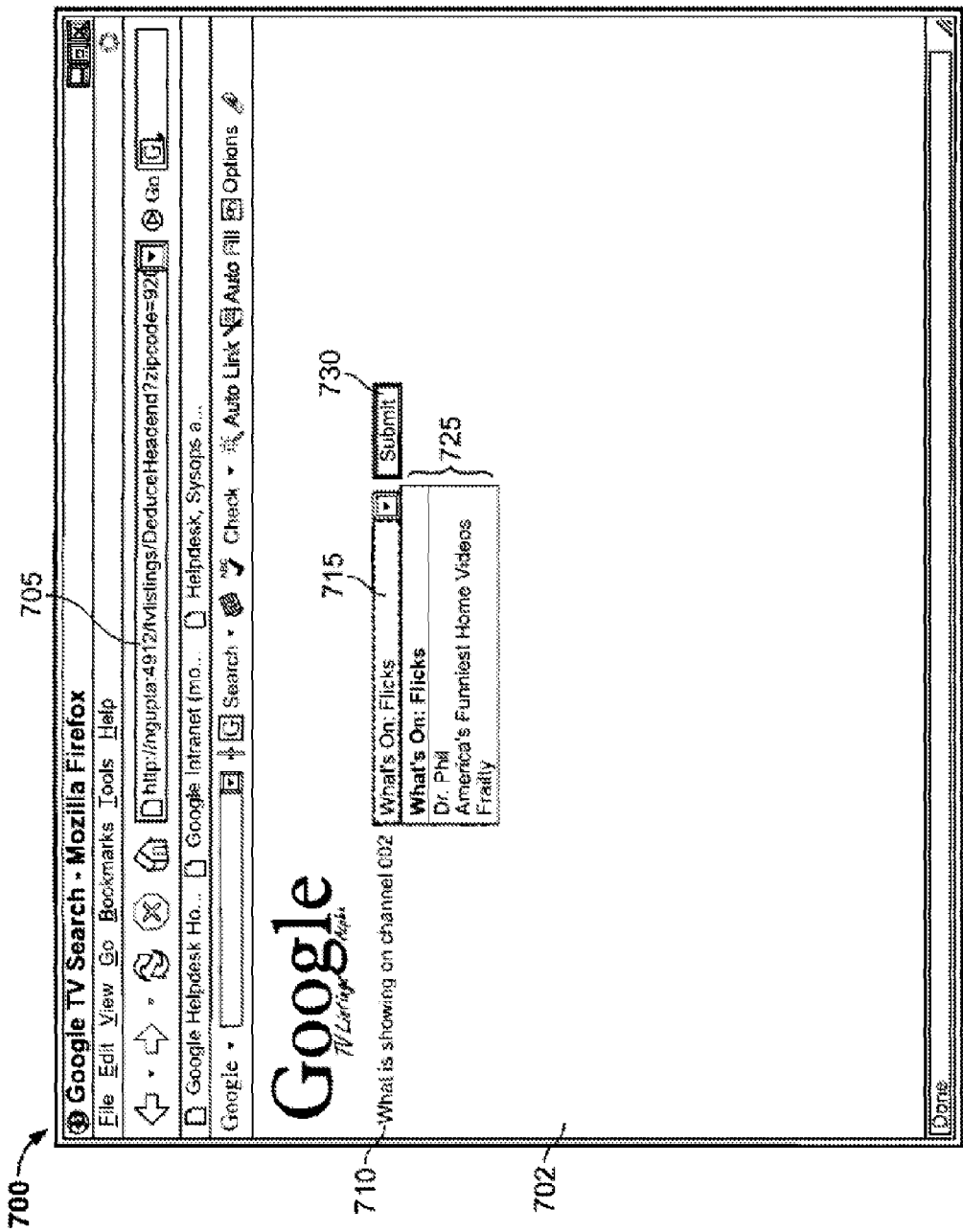
FIG. 7 is a screen shot presenting options as a result of a user response from FIG. 6.

FIG. 7 is a screen shot presenting options as a result of a user response from FIG. 6. The screen shot 700 includes a browser window 701 containing content 702 that may result from the user input from FIG. 6. The address field contents 705 may be the same or different from those in FIG. 6, which may reflect redirection to different pages of the telecom programming schedule ID system. In this example, the user may not have known their telecom provider, and thus may have selected the "Unsure?" link 615 in FIG. 6. (A similar screen shot may be presented, however, even if the user did know and select their telecom provider, yet the provider broadcasts multiple viewing options from more than one telecom programming schedule, or head end.)

A structure such as the query module 230 in this example may generate a prompt 710 asking the user for information on what is currently being received by their television on a specific television channel. The selection module 240 may have retrieved current programming information from the telecommunications provider database 250 corresponding to the list of telecom providers 625 generated by the first query 510, and may have passed the programming information to the query module 230. The query module 230 may parse the information so as to generate a list of shows 725 that are currently airing from various possible head ends. The user may then tune to the channel indicated by the query 710, recognize the currently airing show, and select this show from the list 725. The user may then submit the selection using control 730.

In some cases, an answer to a single question 710 may sufficiently determine the user's unique telecom programming schedule. In other cases, additional questions may be asked of the user which take into account the answers to previous questions.

Figure 8:
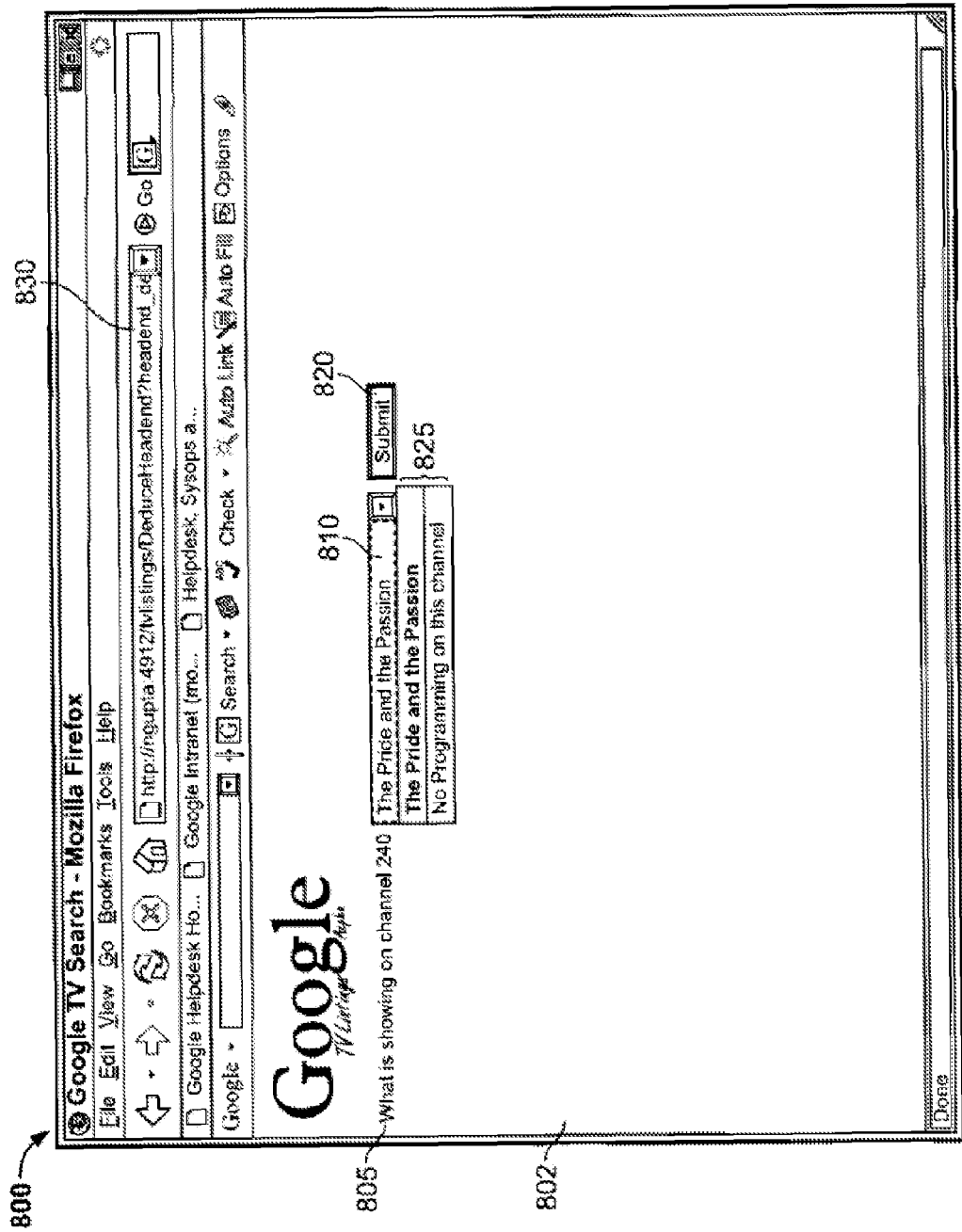
FIG. 8 is a screen shot presenting options as a result of user response from FIG. 7.

FIG. 8 is a screen shot presenting options as a result of user response from FIG. 7. The address field contents 830 again may be the same or different from that in FIG. 7, which may reflect redirection to different pages of the telecom programming schedule ID system. The screen shot 800 includes a browser window 801 displaying content 802 that may result from the user input from FIG. 7, if the telecom programming schedule was not determined by the first question 710. The query module 230 may ask the user to tune to a different television channel, and select from a list 825 of the current programming on that channel. The selected program 810 may be submitted to the response handler 225 by selecting a hyperlink 820.

The process of asking questions of the user's current programming based on answers from a previous question, like those presented above, may be continued until the telecom programming schedule is finally determined by excluding all telecom programming schedule possibilities but one. When this occurs (or whenever enough information has been received so that an appropriate schedule or head end may be determined with sufficient certainty), the user may be presented with their telecom programming schedule to be used in other applications, or, the user may be presented with current programming information based on their telecom programming schedule.

Figure 9:
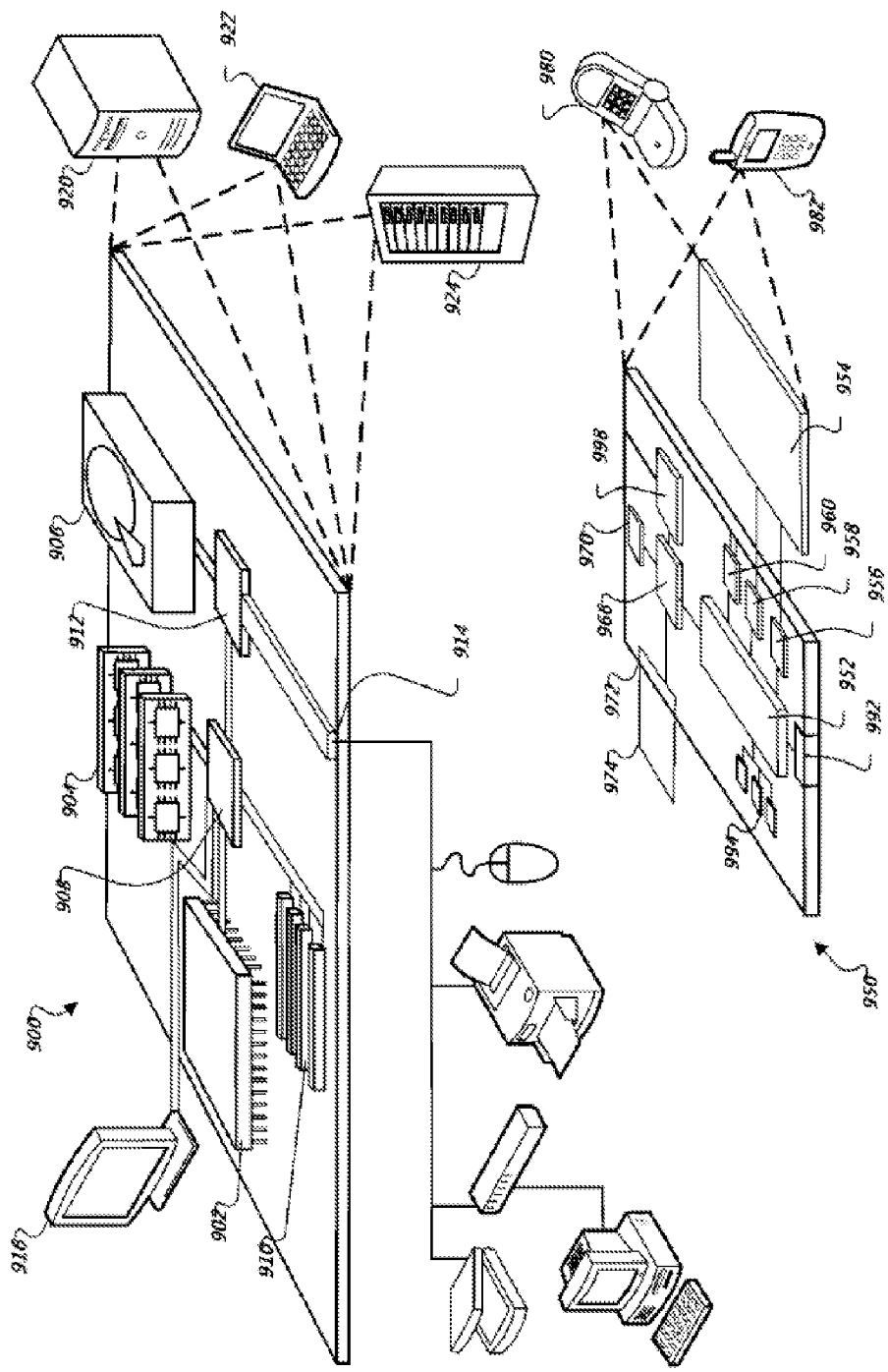
FIG. 9 is a schematic diagram of a generic computer system that may be used to implement the features described herein.

FIG. 9 is a block diagram of computing devices 900, 950 that may be used to implement the systems and methods described in this document, either as a client, as a server, or as a plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a computer-readable medium. In one implementation, the memory 904 is a volatile memory unit or units. In another implementation, the memory 904 is a non-volatile memory unit or units.

The storage device 906 is capable of providing mass storage for the computing device 900. In one implementation, the storage device 906 is a computer-readable medium. In various different implementations, the storage device 906 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of duties is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can process instructions for execution within the computing device 950, including instructions stored in the memory 964. The processor may also include separate analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD display or an OLED display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication (e.g., via a docking procedure) or for wireless communication (e.g., via Bluetooth or other such technologies).

The memory 964 stores information within the computing device 950. In one implementation, the memory 964 is a computer-readable medium. In one implementation, the memory 964 is a volatile memory unit or units. In another implementation, the memory 964 is a non-volatile memory unit or units. Expansion memory 974 may also be provided and connected to device 950 through expansion interface 972, which may include, for example, a SIMM card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS receiver module 970 may provide additional wireless data to device 950, which may be used as appropriate by applications running on device 950.

Device 950 may also communication audibly using audio codec 960, which may receive spoken information from a user and convert it to usable digital information. Audio codex 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments for determining a headend ID have been described. Nevertheless, it will be understood that various modifications may be made without departing from the spirit and scope of this disclosure. For example, various forms of the flows shown above may be used, with steps re-ordered, added, or removed. Also, although several applications of determining a headend ID and methods have been described, it should be recognized that numerous other applications are contemplated. Accordingly, other embodiments are within the scope of the following claims.

What is claimed is:

1. A computer-implemented method, comprising:
   transmitting to a remote electronic device one or more requests for non-geographic information about telecommunications service for a user;
   receiving from the remote electronic device one or more answers to the requests for non-geographic information, which answers do not include the user's telecommunications carrier, but do include a description of a design of one or more physical items belonging to or originating from the telecommunications carrier, wherein the non-geographic information provided in the answers includes a name of a television program currently being broadcast to the user on a particular television channel; and
   based on the one or more answers that includes the name of the television program, identifying the user's telecommunications carrier and selecting carrier-specific programming information from among multiple sets of programming information, for delivery of television programming information to the user;
   wherein the one or more physical items include a service bill.

2. The method of claim 1, further comprising forming the requests for non-geographic information about telecommunications services for the user.

3. The method of claim 1, further comprising identifying a television head end having characteristics that match the one or more answers.

4. The computer-implemented method of claim 3, further comprising transmitting to the remote electronic device carrier-specific programming information comprising an electronic program guide that corresponds to the identified television head end.

5. The method of claim 1, further comprising transmitting to the remote electronic device a request for geographic information and receiving a response that includes geographic information.

6. The computer-implemented method of claim 5, wherein the response that includes the geographic information comprises a ZIP code.

7. The method of claim 1, wherein selecting carrier-specific programming information comprises matching the received one or more answers to a parameter in a database of programming information.

8. The method of claim 7, wherein selecting carrier-specific programming information further comprises eliminating carrier-specific programming information that is inconsistent with the received one or more answers until a single instance of carrier-specific programming information is identified.

9. The method of claim 1, further comprising generating the requests for information by speech synthesis and receiving the one or more answers by voice recognition.

10. A system, comprising:
    an interface for (i) receiving a geographical identifier and one or more responses to requests for information from a user, which responses include one or more non-geographic parameters that correspond to the user's telecommunications provider and do not include the user's telecommunications provider, and for (ii) sending one or more answers to the requests, which include a description of a design of one or more physical items belonging to or originating from the telecommunications provider, wherein the one or more physical items include a service bill;
    a selection module for identifying one or more telecommunications providers within a geographic area associated with the geographic area identifier and for identifying a particular telecommunications provider of the one or more telecommunications providers based on the one or more responses from the user that includes a name of a television program currently being broadcast to the user on a particular television channel;

means for transmitting carrier-specific programming information from among multiple sets of programming information to the user, wherein the carrier-specific programming information corresponds to programming available to the geographic area from the identified particular telecommunications provider; and a memory storing data relating to non-geographic parameters for a plurality of telecommunications providers including the one or more telecommunications providers within the geographic area, wherein the parameters are related to an item selected from a group consisting of content provider bill design, content provider invoice totals, content provider package price, current broadcasting content that identifies a name of a television program currently being broadcast on a particular television channel, and physical attributes of telecommunications signal receiving equipment.

11. A computer-implemented method, comprising:

transmitting to a remote electronic device a request for a user of the remote electronic device to identify a name of a television program from a plurality of names of television programs provided to the user, which identified television program corresponds to a television program being broadcast at that time to the user on an identified television channel;

receiving from the remote electronic device an answer to the request, which answer identifies the name of the television program being broadcast at that time on the identified television channel and does not include the user's telecommunications provider, but that does include a description of a design of one or more physical items belonging to or originating from the telecommunications carrier, wherein the one or more physical items include a service bill;

based on the answer, identifying the user's telecommunications provider and selecting carrier-specific programming information from among multiple sets of programming information based on the identification; and transmitting an electronic program guide to the remote electronic device for presentation to the user, which electronic program guide includes content that corresponds to the selected carrier-specific programming information.

12. The method of claim 11, further comprising:

transmitting to the remote electronic device a request for a geographic location identifier that identifies a geographic region in which the remote electronic device is located; and receiving from the remote electronic device the geographic location identifier;

wherein selecting carrier-specific programming information is further based on the geographic location identifier.

13. The method of claim 12, wherein the geographic location identifier comprises a zip code that corresponds to the geographic region in which the remote electronic device is located.

* * * * *